March 27, 1951  R. A. ASHTON  2,546,685
SAFETY DEVICE FOR ROTATED SHAFTS
Filed Nov. 8, 1947
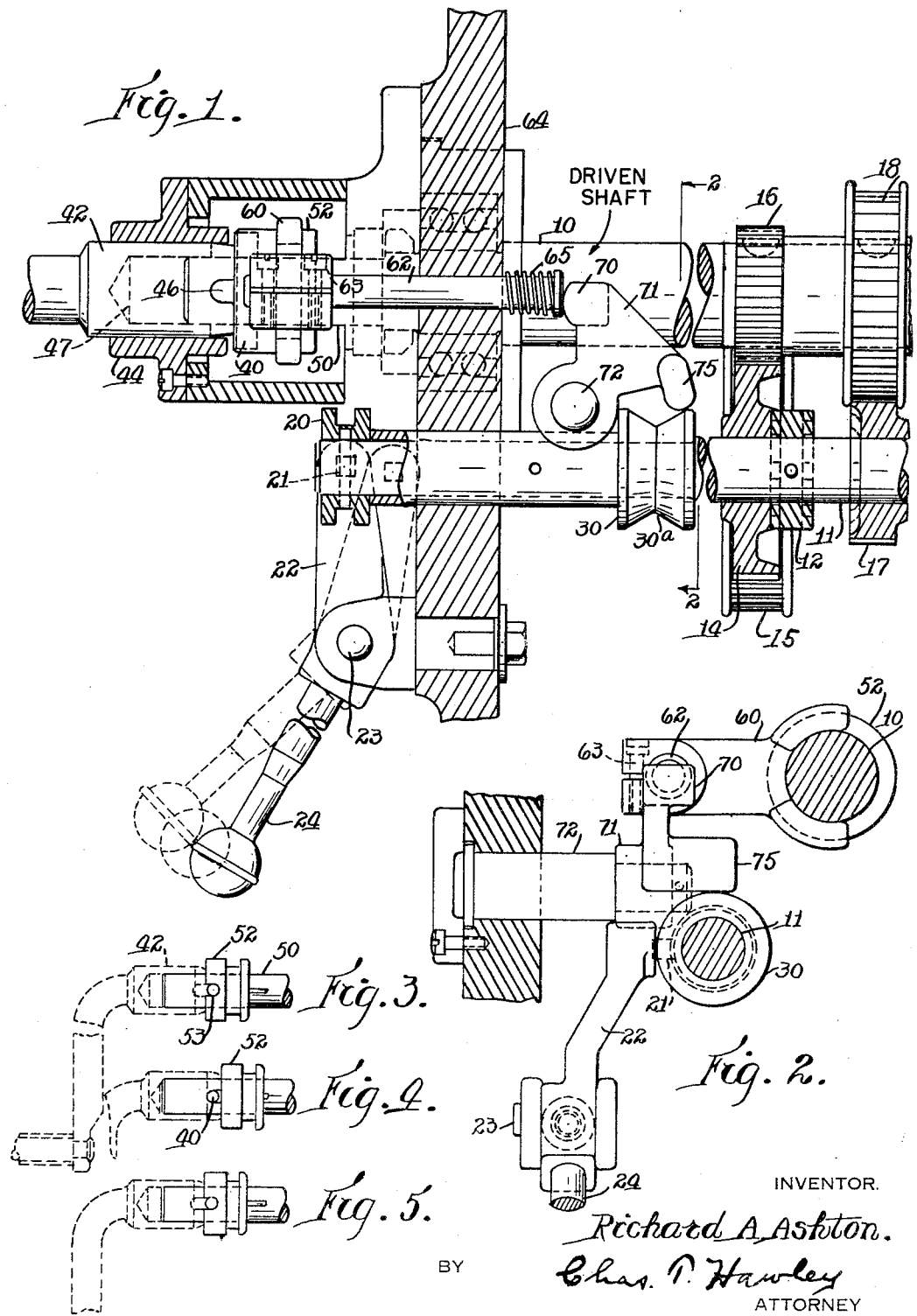
INVENTOR.
Richard A. Ashton.
BY Chas. P. Hawley
ATTORNEY Patented Mar. 27, 1951

2,546,685

UNITED STATES PATENT OFFICE 2,546,685

SAFETY DEVICE FOR ROTATED SHAFTS

Richard A. Ashton, Seneca Falls, N. Y., assignor to Seneca Falls Machine Company, Seneca Falls, N. Y., a corporation of Massachusetts Application November 8, 1947, Serial No. 784,817

3 Claims. (Cl. 74—625)

This invention relates to means for preventing the application of a hand crank to a rotated shaft while the shaft is in motion.

It is desirable in certain machines to apply a hand crank to a shaft to permit manual movement of the shaft for setting tools, adjusting cams and for other similar purposes, but it is quite dangerous to attempt to apply a hand crank to such a shaft while the shaft is in rotation.

It is the general object of my invention to provide a safety device by which such dangerous applications of a hand crank is rendered impossible.

In the preferred form, such application of the crank is prevented when the shaft is in rotation either in a forward or a reverse direction.

My invention further relates to arrangements and combinations of parts which will be hereinafter described and more particularly pointed out in the appended claims.

A preferred form of the invention is shown in the drawings, in which

Fig. 1 is a sectional plan view of mechanism embodying my invention;

Fig. 2 is a sectional end elevation, taken along the line 2—2 in Fig. 1; and

Figs. 3, 4 and 5 are detail views illustrating the operation of my invention.

Referring to the drawings, I have shown a driven shaft 10 which may be rotated from a driving shaft 11 through a clutch 12. The clutch 12, when in the position shown in Fig. 1, connects the driving shaft 11 to the driven shaft 10 through a gear 14, idle gear 15, and pinion 16 for rotation in a backward direction. If the clutch 12 is shifted to the right in Fig. 1, the clutch will connect the driving shaft 11 to the driven shaft 10 through a pinion 17 and gear 18 for forward rotation.

The clutch 12 is keyed to the driving shaft 11 and the shaft 11 is provided with a grooved collar 20 engaged by a clutch pin 21 in a shift lever 22 pivoted at 23 and movable manually by a handle 24. By shifting the handle 24, the clutch 12 may be placed in neutral or mid-position or may be caused to engage either the gear 14 or the pinion 17. A grooved collar 30 is mounted on the shaft 11 and is axially movable therewith.

The reduced portion 50 (Fig. 3) of the driven shaft 10 (Fig. 1) is provided with a cross-pin 40 (Fig. 4), and a hand crank 42 is slidable axially in a guide sleeve 44 mounted in alignment with the driven shaft 10. The hand crank 42 is notched as indicated at 46 and is recessed as indicated at 47, so that the crank may be slipped over the reduced end portion 50 of the driven shaft 10, and with the notch 46 engaging the cross-pin 40.

A grooved collar 52 (Fig. 3) is keyed on the reduced portion 50 of the driven shaft 10 and is notched at 53 to fit over the cross-pin 40. When the collar 52 is in the left-hand position shown in Figs. 1, 3 and 5, the collar engages the end of the hand crank 42 and prevents the hand crank from contacting the cross-pin 40.

The grooved collar 52 is engaged by a yoke 60 (Fig. 2) which is secured on a plunger 62 by clamping screws 63. The plunger 62 is slidable in a fixed frame member 64 (Fig. 1) and is provided with a spring 65 which tends to shift the collar 52 to the right or to inoperative position.

The plunger 62 is engaged by a lug 70 (Fig. 1) on a bell crank 71 which is mounted on a fixed stud 72. A second lug 75 on the crank 71 engages the sliding collar 30 previously described.

When the handle 24, collar 30 and clutch 12 are in mid position, the lug 75 will seat in the groove 30a of the collar 30, and the spring 65 will be free to withdraw the collar 52 to the position shown in Fig. 4, thus permitting the hand crank to be applied.

If, however, the handle 24, collar 30 and clutch 12 are shifted from mid position in either direction, the lug 75 will be raised by one or the other of the flanges of the collar 30 to the position shown in Fig. 1, thus preventing the spring 75 from moving the collar 52 to inoperative position. It is then impossible to engage the hand crank with the cross-pin 40.

Simple and effective provision is thus made for preventing application of the hand crank when the driven shaft 10 is in rotation in either direction.

Having thus described my invention and the advantages thereof, I do not wish to be limited to the details herein disclosed, otherwise than as set forth in the claims, but what I claim is:

1. In a machine, a driven and rotated shaft, a hand crank slidably mounted on said shaft, means on said driven shaft engageable by said hand crank to turn said shaft, safety means slidable axially on said driven shaft to safety and release positions and permanently associated with said shaft and preventing operative turning engagement of said hand crank with said driven shaft when said safety means is in safety position, a member operatively associated with said safety means and effective to shift said safety means axially to said safety position, means to return said safety means to release position, a device movable axially to control the application of power to rotate said driven shaft, manual means to move said control device to cause power to be applied to said driven shaft, and a part movable with said control device and coacting with said member and through which part movement of said manual means and said control device to apply power to rotate said driven shaft also moves said member to shift said safety means to safety position and to thereby prevent engagement of said hand crank with said driven shaft.

2. In a machine, a driven and rotated shaft, a hand crank slidably mounted on said shaft, means on said driven shaft engageable by said hand crank to turn said shaft, safety means slidable axially on said driven shaft to safety and release positions and permanently associated with said shaft and preventing operative turning engagement of said hand crank with said driven shaft when said safety means is in safety position, a member operatively associated with said safety means and effective to shift said safety means axially to said safety position, means to return said safety means to release position, a device movable axially to control the application of power to rotate said driven shaft in forward and reverse directions, manual means to move said control device selectively to cause power to be applied to said driven shaft, and a part movable with said control device and coacting with said member and through which part movement of said manual means and said control device to apply power to rotate said driven shaft in either direction also moves said member to shift said safety means to safety position and to thereby prevent engagement of said hand crank with said driven shaft.

3. In a machine, a driven shaft, a hand crank, means to engage said crank with said driven shaft, a safety sleeve mounted on said driven shaft and permanently associated with said shaft, a device controlling the application of power to rotate said driven shaft, a collar movable with said control device to opposite extreme driving positions and having an annular center groove, and a lever movable by said collar to shift said safety sleeve relative to said shaft and to thereby render said sleeve operative to prevent engagement of said hand crank with said driven shaft whenever said lever is displaced from said center groove by axial movement of said collar by said control device from mid-position toward extreme position in either direction and said driven shaft is in rotation.

RICHARD A. ASHTON.

REFERENCES CITED

The following references are of record in the file of this patent:

UNITED STATES PATENTS

| Number | Name | Date |
|---|---|---|
| 1,477,480 | Groene | Dec. 11, 1923 |
| 1,498,300 | Ryder | June 17, 1924 |
| 1,585,854 | Hammond | May 25, 1926 |
| 1,587,470 | Campbell | June 1, 1926 |
| 1,759,650 | Littler | May 20, 1930 |
| 1,762,926 | Littler | June 10, 1930 |
| 2,404,153 | Wilhelm | July 16, 1946 |